July 20, 1943.  G. A. TINNERMAN  2,324,653
SHEET METAL ADJUSTING NUT OR THE LIKE
Filed July 26, 1940
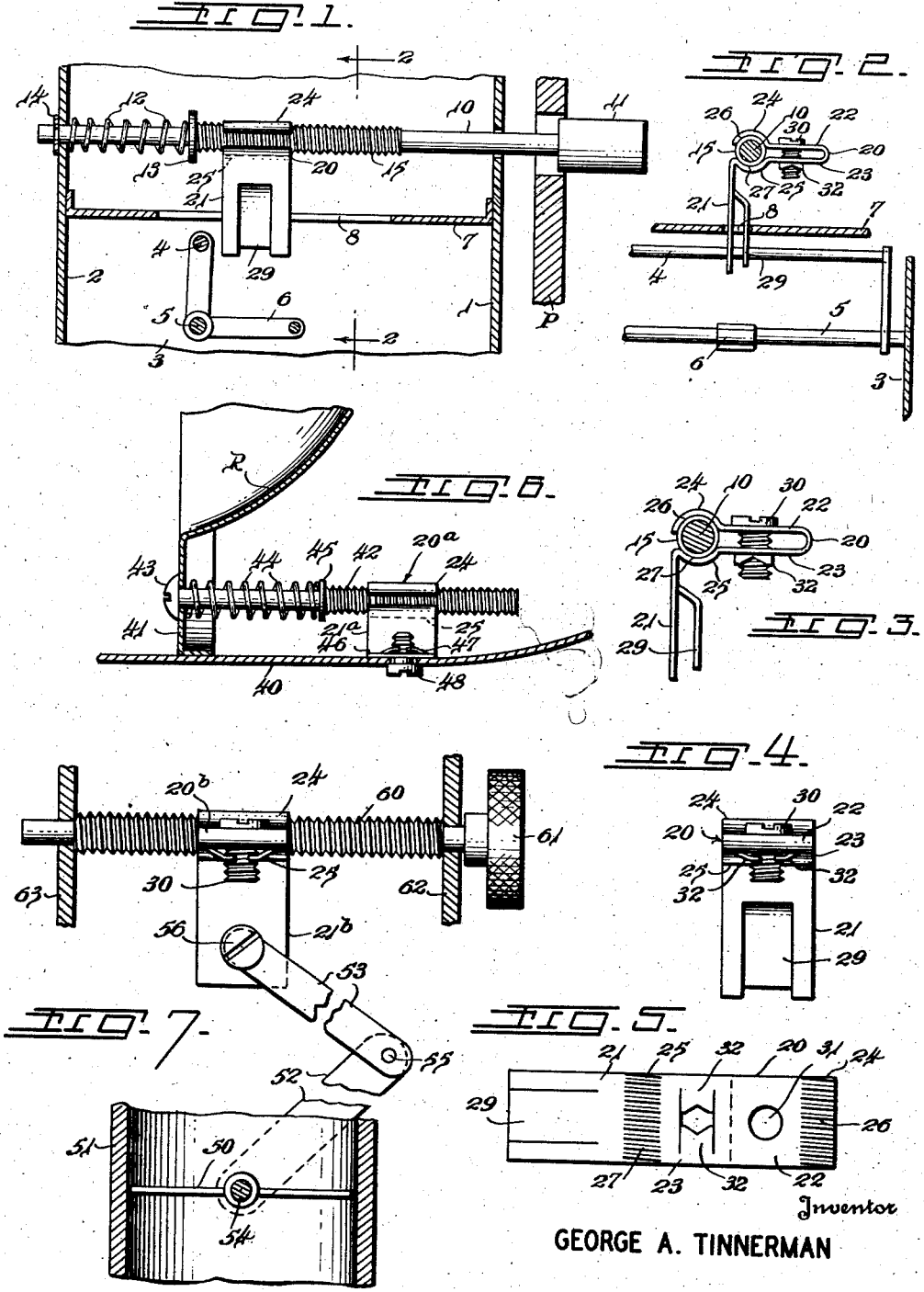
Inventor
GEORGE A. TINNERMAN
By: H. J. Lombard,
Attorney Patented July 20, 1943

2,324,653

UNITED STATES PATENT OFFICE 2,324,653

SHEET METAL ADJUSTING NUT OR THE LIKE

George A. Tinnerman, Cleveland, Ohio, assignor to Tinnerman Products, Inc., Cleveland, Ohio, a corporation of Ohio Application July 26, 1940, Serial No. 347,796

9 Claims. (Cl. 151—21)

This invention relates to an improved form of adjusting nut device for use with an adjustable bolt, screw or other threaded fastener as a fastening means of general utility for adjustably securing a part with respect to a cooperating part in an installation, or otherwise adapted to be employed in the manner of an adjustable gauge or check device for providing a predetermined motion or limit of movement to a movable element in an assembly.

More particularly, the present invention deals with an improved form of simple, inexpensive sheet metal nut device capable of relatively fine and minute adjustment on a bolt or screw and under continuously effective spring force which provides a positive thread locking action with the bolt or screw to retain the same against accidental turning and unintended rotation from any setting or adjusted position thereof incident to vibration, jarring effects, and the like.

A primary object of the invention is for the provision of an adjusting nut device of this character which dispenses entirely with the necessity for auxiliary lock nuts, lock washers, and the like, for preventing rotation of the bolt or screw in adjusted position and otherwise reduces to a minimum the time required not only for adjusting the same in a completed mounting but also, for the initial assembly thereof in an installation. In the ordinary arrangement for adjusting a bolt or screw stop device, for example, an inordinate amount of time is usually required for the several operations of first, loosening the auxiliary lock nut; second, turning the screw to adjusted position; and third, tightening the lock nut in the adjusted position of the bolt or screw. In contrast, by the thread locking nut device of the present invention, the bolt or screw is held in desired adjusted position under constant spring tension which is capable of providing the desired locking effect with the bolt shank to hold the same against any possible looseness or displacement due to vibration, etc., yet permits the same to be readily turned as necessary for any required adjustment or desired setting thereof in an assembly.

Another principal object of the invention, therefore, is to provide an adjustable locking nut fastener of this character comprising a pair of spaced arms extending in the same general direction and having opposing inner face portions provided with complementary thread engaging means for threadedly engaging the thread convolutions of the threaded fastener in the manner of a nut.

A further object of the invention is for the provision of such a nut device from a section of sheet metal and formed into a generally U-shaped device defining a pair of spaced arms having complementary thread engaging portions on the opposed inner faces thereof designed for threadedly engaging the threaded fastener under a frictional, clamping or gripping force providing the desired thread locking action of the sheet metal nut with the threaded fastener in any desired setting or position of adjustment.

Still another object of the invention is to provide a sheet metal nut of the kind described in which the opposing arms are of a spring nature and adapted for a variable clamping or gripping action supplied by a set screw arrangement providing for any necessary or desired degree of thread locking action of the spring arms with the adjustable bolt or screw fastener.

A more specific object of the invention is to provide such a sheet metal fastener which may be most economically manufactured as a simple, one-piece nut device comprising a pair of superposed spring arms provided with complementary thread surfaces integrally formed on opposing inner face portions thereof and designed for threadedly engaging an adjustable bolt or screw in a manner to provide for relatively fine and minute adjustments thereof in an installation, and under a pronounced and positive thread locking action supplied by a set screw element effecting a clamping or gripping force of the superposed spring arms of the fastener in threaded engagement with the adjustable bolt screw in any setting or position of adjustment thereof.

Further objects and advantages and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a vertical sectional view through an adjustable push-button control mechanism of a radio apparatus, for example, showing one application and use of the improved adjusting nut of the present invention as an adjustable check or gauge device;

Fig. 2 is a fragmentary sectional view taken on line 2—2 of Fig. 1 looking in the direction of the arrows;

Fig. 3 is an enlarged view of the adjusting nut as seen in edge elevation in Fig. 2 in its relation to the cooperating screw threaded rod or bolt represented in section;

Fig. 4 shows the adjusting nut in side elevation as viewed from the right of Fig. 3; and, Fig. 5 represents a blank from which the adjusting nut shown in Figs. 1 to 4 inclusive may be constructed.

Fig. 6 shows a further embodiment of the invention in which the adjusting nut is employed with a bolt or screw adjustably securing a part with respect to a cooperating part in an installation; and, Fig. 7 shows another application and use of the improved adjusting nut of the invention as an adjustable connecting device in a control linkage.

The fastening device of the present invention is one of general utility so far as concerns the provision of a sheet metal nut having a positive thread locking action with an adjustable bolt or screw, as when employed in the manner of an adjustable gauge, check or stop device, or as a means for adjustably securing a part with respect to another cooperating part in an assembly. In several of its more important uses, for example, the fastening device is employed as a means for mounting a bolt serving as the adjustment control element in various forms of carburetor units; in various automobile headlamp constructions, as a means for adjustably retaining the screws or bolts supporting the reflector within the headlamp sub-body and otherwise capable of adjustment to move the reflector as may be necessary to adjust the headlamp beam; and, in certain forms of selective push-button control units for radio apparatus wherein the fastening device is threadedly engaged on the adjustable control rod or shaft of a push-button unit to define means serving as a substantial gauge or check device providing for a predetermined motion or limit of movement to a movable element forming part of the automatic control means associated with the tuning mechanism of the radio apparatus.

Referring now, more particularly, to the drawing, Figs. 1 and 2 illustrate, for example, one important application and use of the improved fastening device of the present invention as employed in the manner of an adjustable check or gauge device for such a push-button control unit. In the general organization shown, it will be understood that a plurality of such push-button control units are suitably mounted to the rear of an outer panel P forming a portion of the front, top or side of the radio cabinet. Each unit includes a control rod 10 extending through an opening in said panel P and provided with a push-button extremity 11 projecting from the outer face of such panel. The control rod 10 may be mounted in any suitable way as, for example, by spaced brackets 1, 2 having aligned apertures slidably receiving said control rod at spaced points. Said control rod 10 otherwise is secured in such mounting in a manner to permit the same to readily reciprocate upon being pushed inwardly and returned automatically to its normal position under influence of a coil spring 12 telescoped thereover and engaging the adjacent inner face of bracket 2 at one end, and a collar 13 on said rod at its other end. Another collar 14, cotter pin, or the like fastening means is fixedly secured to said rod 10 at the outer face of said bracket 2. Said control rod 10 may, of course, be thus mounted in various other ways for the desired reciprocatory movement, and, in the present illustration, when said push-button 11 thereof is pushed inwardly, the coil spring 12 is compressed by collar 13 against the adjacent inner face of bracket 1. When pressure is removed from the push button 11 the rod 10 is automatically returned to its initial position with its outward movement being limited by the collar 14 engaging the outer face of said bracket 2.

Between said brackets 1, 2, a bell crank mechanism for actuating the tuning element of the radio apparatus (not shown) is mounted in position to be engaged by means of the selected control rod 10 which is pushed inwardly to provide the desired setting of such tuning element. The bell crank mechanism comprises a striker rod 4 fixedly spaced from a main shaft 5 having its ends rotatably mounted in side brackets or supports 3. A connecting arm 6, or the like, is fixedly secured to said main shaft 5 at one end and has its opposite free end arranged for connection to the tuning element to operate the same. Between such bell crank mechanism and the push rod 10, there is mounted a shelf 7 provided with a series of slots 8 for a purpose hereinafter appearing.

The control rod 10 is provided with an intermediate thread surface 15 such that the same is, in effect, a screw threaded spindle for use in the manner of an adjustable bolt or screw which may be rotated to move the associated adjusting nut device 20 relative thereto for any necessary or desired setting or position of adjustment. In this relation, the adjusting nut device 20 is provided with a projecting lug or tail section 21 adapted to engage the striker rod 4 on the bell crank mechanism to serve in the manner of an adjustable check or gauge device.

From the foregoing, it will be understood that the connecting arm 6 for operating such tuning unit, is arranged to be oscillated an amount in proportion to the movement imparted to the striker rod 4 by the tail or lug section 21 of the adjusting nut device carried by each of the push rods 10. While all of such push or control rods 10 have a more or less uniform normal position in the installation with the push-buttons 11 thereof in predetermined projecting relation to the panel P, the respective nut devices 20 thereon are adjustable to different positions, as necessary, to locate the lug or tail sections 21 thereof in position to impart different movements to the striker rod 4 which in turn, rotates the shaft 5 and oscillates connecting arm 6 a proportionate distance to provide the desired setting of the tuning element in accordance with selected control rod 10 which is pushed inwardly. Because of the extreme sensitivity of the tuning element, the arrangement of a nut device 20 on the thread portion 15 of a push rod 10, therefore, must necessarily be such as to be capable of fine minute adjustments by rotation of the push rod for this purpose through turning of the associated push-button 11 thereof.

The adjusting nut device of the present invention is particularly suited for such fine and minute adjustments and, at the same time, is designed for a clamping or gripping action in threaded engagement with such thread portion 15 of push rod 10 to effectively lock the same in any position of adjustment against loosening or displacement incident to vibration and jarring effects. As best seen in Figs. 2 and 3, the said nut section 20 of the fastening device assumes the general form of a substantial U-shape comprising a pair of spaced arms 22, 23 having rod gripping portions 24, 25, respectively, bent to define a generally cylindrical sleeve or similar passage therebetween for receiving snugly the thread portion 15 of the push rod or spindle 10. The fastening device is constructed from a blank or stamping of any suitable sheet metal material, preferably of spring metal or of metal having spring-like characteristics such as cold rolled steel. While the fastening device obviously may be formed of sheet metal sections of various outlines, the same is preferably provided from a simple, generally rectangular stamping as illustrated in Fig. 5, for example, which is readily obtained from ordinary sheet metal strip stock with little or no loss or waste of material in providing a device capable of economical quantity production and relatively low cost.

On the opposing inner faces of the rod gripping portions 24, 25, there are provided complementary thread surfaces 26, 27, respectively, Fig. 5, formed by spaced series of similar grooves having an inclination corresponding to the inclination of the thread convolutions on the thread portion 15 of the rod or spindle 10. Such similar grooved surfaces 26, 27 are provided by what may be termed a coining operation in which the same are cut or otherwise provided during the forming of the rounded rod gripping portions 24, 25. The blank is then bent substantially as indicated by the dotted line in Fig. 5 to dispose the arm portions 22, 23 thereof in predetermined spaced relation, as best seen in Fig. 3, with said rounded rod gripping portions 24, 25, defining a generally cylindrical sleeve or similar passage for receiving the rod 10, as aforesaid. In this relation, the thread surfaces 26, 27, on the inner faces of said rod gripping portions 24, 25 are substantially oppositely disposed to cooperate in defining a female thread surface or nut section having threads complementary to the thread surface 15 of the rod or spindle 10. Preferably said thread surfaces 26, 27, are of such size as to engage the thread portion 15 over a major portion of its periphery to provide a pronounced frictional gripping contact in threaded engagement therewith under the compressive spring force of the arms 22, 23. To this end, said arms 22, 23 are suitably designed to be spread apart and tensioned when the thread portion 15 of the push rod 10 is introduced between said rounded rod gripping portions 24, 25 into threaded engagement with the thread surfaces 26, 27 thereof.

In many cases this spring force supplied by the tensioned spring arms 22, 23, is sufficient to provide the desired thread locking action of the thread surfaces 26, 27, in threaded engagement with the rod or spindle 10. However, in order to provide a positive thread locking action in this relation, the intermediate portions of said arms 22, 23 are provided with means for receiving a set screw 30 by which said arms may be drawn together in a manner to supply a pronounced clamping action to said rounded rod gripping portions 24, 25 thereof. Accordingly, as illustrated in Fig. 5, for example, that portion of the blank defining the arm 22 is provided with a screw passage 31 while the other arm 23 is formed with an integral thread engaging portion comprising opposing tongues 32 defining a thread opening therebetween which is aligned with screw passage 31 in arm 22 in the bent generally U-shaped configuration of said arms substantially as shown in Fig. 3. The set screw 30 is thereupon applied through passage 31 in arm 22 into threaded engagement with the thread opening defined by the extremities of tongues 32 and this, of course, provides for said arms 22, 23 to be drawn together as required to provide the desired positive thread locking action of the thread surfaces 26, 27 thereof with the thread portion 15 of the rod or spindle 10. Such thread locking is usually fixed at not greater than thumb-tight in order that the rod 10 may be rotated to provide any necessary or desired adjustment of the nut 20 thereon without loosening the set screw 30. In this respect, to guard against wear of the thread portion 15 of the rod 10 in installations in which frequent adjustments take place, such thread portion 15 may be put to a suitable hardening treatment to provide the required toughness and hardness, as necessary, depending on the hardness of the sheet metal of which the nut device is made, in order to withstand such service requirements.

Said thread engaging means 32 may be pressed, stamped, extruded or otherwise provided on the arm 23 in any suitable form or construction so long as the same threadedly engage with the thread of the screw as it is drawn taut. In this relation, the present invention fully contemplates the provision of such thread engaging means in various other related forms as in the manner of a substantial perforated protuberance which is pressed from the sheet metal and which is shaped to provide a helical thread or otherwise has the walls thereof tapped to provide a plurality of threads for threadedly engaging the set screw. However, it has been found that such thread engaging means prepared in the form of cooperating, yieldable tongues, as shown, are the most efficient and the most practical in that they are possessed of unusual inherent strength and will not collapse or pull through when the set screw is tightened nor loosen under continuous strain and vibration in the installation in which the device is employed. This takes place by reason of the fact that the sheet metal material from which such tongues 32 are formed is of less thickness than the pitch or spacing of the threads of the bolt or screw 30, wherefore such tongues tend, more effectively, to move toward each other and dig into the grooves intermediate adjacent threads of the set screw when tightened therewith and otherwise become embedded in the root diameter thereof in locked, frictional fastening engagement therewith in applied fastening position. In the present example, such tongues 32 are shown in Fig. 4 as extending out of the plane of arm 23 in substantial ogee formation and provided preferably with notched extremities forming substantial biting jaws designed to cut into the root diameter of the set screw and adjacent thread surfaces thereon in positive locking relation therewith in the most effective manner. It is to be understood, however, that the present invention is not limited in any manner or form to this construction of the thread engaging means 32 but rather, comprehends also, various other forms of such tongues or equivalent thread engaging elements.

In the installation of Figs. 1 and 2, the adjustable nut device 20 has the lug or tail section 21 thereof designed for use as an adjustable check or gauge element engaging the striker rod 4, as aforesaid, and in order that the same may be adjusted on the thread portion 15 of the push rod 10 when rotated, such tail section 21 is fitted for sliding movement in its associated guide slot 8 in the shelf 7, Figs. 1 and 2. Said tail section 21 preferably includes a struck out finger element 29 suitably spaced therefrom to frictionally engage the adjacent edge of the slot 8 and thereby provide for a snug sliding fit of the tail section 21 in such guide slot axially of the push rod 10. By being thus engaged in the guide slot 8, the tail section 21, is held against lateral displacement or shifting while the nut section 20 thereof is threadedly engaged with the thread portion 15 of said push rod 10 to be disposed in fixed relation thereto in any axial reciprocation of said push rod. However, the nut section 20 is adjustable on the thread portion 15 of said push rod by turning the push-button 11 thereof, in which event the tail section 21 slides in said guide slot 8 to the desired adjustment or setting thereof with respect to the rocker arm 4 depending on the amount of movement to be imparted to the bell crank mechanism to actuate the tuning element associated therewith, as aforesaid.

It will be appreciated that in the operative position of the rod gripping portions 24, 25 of the nut device with their respective thread surfaces 26, 27, in threaded engagement with the thread portion 15, the spring clamping force of the arms 22, 23, provides the desired thread locking action with the push rod 10 or similar bolt or screw element. This clamping force can be made as pronounced as necessary or desired depending on the degree to which the set screw 30 is tightened such that said push rod is not subject to unintended rotation or accidental displacement which would disturb the setting thereof in any position of adjustment. If the set screw 30 is tightened to its extreme, there is obtained a permanent locking action of the rod gripping portions 24, 25 with the push rod or other bolt or screw element, as is required or desirable in some installations. However, if frequent adjustments are to be made, the set screw 30 need be tightened only to such extent as to ensure a positive spring locking action of the rod gripping portions 24, 25, in threaded engagement with the thread portion 15 of the push rod. This, of course, is sufficient to retain the push rod 10 against accidental or unintended rotation in any position of adjustment, but at the same time, permits the push rod or other bolt or screw to be rotated as through turning the push-button 11, to provide any desired adjustment or change of position of the nut section 20 relative thereto by being advanced or retracted on the thread portion 15 thereof.

The spacing of the arms 22, 23 of the fastening device for resiliency and the spring metal construction of the nut device provides for the desired adjustable spring locking action of the rod gripping portions 24, 25, having their respective thread surfaces 26, 27 in threaded engagement with the thread portion 15 of the push rod; and under the clamping force supplied by the set screw 30, such thread locking action is made pronounced and positive in the manner and for the purposes previously described. Since the set screw 30 is fixed in any applied position by the thread locking action of the tongues 32 therewith, the clamping force supplied thereby to the arms 22, 23, and rod gripping portions 24, 25, is uniform and constant, and after being once applied and tightened in an assembly, said set screw 30 is not subject to any displacement which would result in loosening of the rod gripping portions 24, 25, and otherwise permit any possible unintended and undesired slippage or other movement thereof which would disturb the proper setting of the nut section 20 on the thread portion 15 of the push rod 10 or other adjustable bolt or screw member.

Fig. 6 illustrates another embodiment of the invention wherein the improved adjusting nut is shown employed as a fastening means of general utility for retaining a bolt or screw adjustably securing a pair of cooperating parts in an installation. In such an installation, as represented in Fig. 6, for example, 40 designates a portion of a headlamp housing in which a reflector R having a flange part 41 is mounted and adjustably retained by a bolt or screw fastening 42 having a head 43 and threaded shank threadedly engaged with an adjusting nut 20ª which is constructed and arranged for operation and use in a manner similar to that described with reference to Figs. 1 to 5 inclusive. The said bolt 42 extends through an opening in part 41 and has telescoped thereover a coil spring 44 engaging between the rearward face of said flange part 41 and a collar 45 provided on the bolt.

In this relation, the bolt is threadedly engaged with the rod gripping portions 24, 25 of the nut member 20ª which is fixedly secured to the headlamp housing or other part 40 as by spot-welding, riveting or otherwise fastening thereto a flange portion of the nut device provided thereon in any suitable way. In a preferred construction, the tail section 21ª of the adjusting nut is bent into a base flange 46 which is provided with an integral thread opening comprising cooperating tongues 47 similar to the tongues 32 provided on the arm 23 of the fastening device as shown and described with respect to Figs. 3 and 4, for example. Such thread portion 47 thus serves to threadedly engage an attaching screw 48 passing through an opening in the headlamp housing to secure the adjusting nut 20ª in proper position to the adjustable bolt or screw 42. In the assembled relation of these parts, the coil spring 44 continuously urges the reflector or other part 41 outwardly against the head 43 of the adjusting bolt. This outward movement is limited, of course, by the position of threaded engagement of the bolt shank 42 with the rod gripping portions 24, 25 of the adjusting nut 20ª; accordingly, when the bolt is rotated to move either inwardly or outwardly, the part 41 is moved correspondingly a distance in proportion to the amount of rotation of the bolt for any necessary or desired adjustment of the parts 40, 41 with respect to each other.

Fig. 7 shows another application and use of the invention in which the improved adjusting nut is employed as an adjustable connecting device in a control linkage. For purposes of illustration, such a linkage is shown embodied in a general form of carburetor control mechanism comprising, for example, a butterfly throttle valve 50 which is adjustable in its mounting in pipe 51 by a linkage consisting of links 52, 53. Link 52 is fixedly connected to one end of the diametral shaft 54 of said valve 50 and pivotally connected at 55 to the lower end of link 53, the other end of said link 53 being pivotally connected to the tail section 21ᵇ of the adjusting nut device 20ᵇ as by pin or screw 56.

The adjusting bolt or screw 60, which is manipulated for rotary movement by a knob 61, is mounted in any suitable way in operative position to the valve mechanism as by brackets 62, 63, having bearing openings supporting said bolt or screw at spaced points on opposite ends of the thread portion thereof. On such thread portion of the adjustable bolt 60, the adjusting nut 20ᵇ has its rod gripping portions 24, 25 threadedly engaged therewith under resilient clamping force of set screw 30 in an arrangement similar to that described with reference to Figs. 1 to 5 inclusive. The tail section 21b of the adjusting nut is provided in any suitable way as by an extension depending from the rod gripping portion 25 and provided with an aperture receiving the pin or screw 56 for pivotally connecting the adjacent end of link 53 thereto, as aforesaid. Accordingly, when said adjusting bolt or screw 60 is rotated to move the adjusting nut 20b thereon the links 52, 53, are moved therewith to cause a proportionate pivotal movement of the butterfly valve 50 on its diametral axis 54. By reason of the fine and minute adjustments which may be imparted to the improved adjusting nut 20b of the present invention, the butterfly valve 50 likewise is capable of very fine adjustments in a highly efficient and satisfactory manner. And since the previously described thread locking action of the rod gripping portions 24, 25 with the adjustable bolt or screw 60 prevents any accidental turning or unintended rotation thereof, there is little possibility of loosening or displacement of the adjusting nut from any setting or position of adjustment, even under extreme conditions of vibratory motion, or the like.

While the invention has been described in detail with specific examples, such examples are intended as illustrations only, since it will be apparent to those skilled in the art that other modifications in the construction, arrangement and general combination of elements thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A nut device comprising a sheet metal body having a bend providing a pair of spaced arms extending in the same general direction, outwardly bent portions on said arms defining a passage for a threaded member, a thread surface on the inner face of one of said outwardly bent portions of the arms for threadedly engaging said threaded member, and means between the junction of the spaced arms and said passage for the threaded member for drawing said spaced arms toward each other to effect a tightened threaded engagement of said thread surface with said threaded member.

2. A nut device comprising a sheet metal body having a bend providing a pair of spaced arms extending in the same general direction, outwardly bent portions on said arms defining a passage for a threaded member, complementary thread surfaces provided on the inner faces of said outwardly bent portions of the arms for threadedly engaging said threaded member, and means between the junction of the spaced arms and said passage for the threaded member for drawing said spaced arms toward each other to effect a tightened threaded engagement of said complementary thread surfaces with said threaded member.

3. A nut device comprising a sheet metal body having a substantially U-shaped bend providing a pair of spaced arms extending in the same general direction and having aligned openings therein adjacent the junction of said arms, outwardly bent portions on said arms defining a passage for a threaded member, complementary thread surfaces on the inner faces of said outwardly bent portions for threadedly engaging said threaded member, and a bolt or screw element passing through said aligned openings for drawing said spaced arms toward each other to effect a tightened threaded engagement of said complementary thread surfaces with said threaded member.

4. A nut device comprising a sheet metal body having a substantially U-shaped bend providing a pair of spaced arms extending in the same general direction and having aligned openings therein adjacent the junction of said arms, outwardly bent portions on said arms defining a passage for a threaded member, complementary thread surfaces on the inner faces of said outwardly bent portions for threadedly engaging said threaded member, and a bolt or screw element passing through said aligned openings for drawing said spaced arms toward each other to effect a tightened threaded engagement of said complementary thread surfaces with said threaded member, one of said openings being defined by integral thread engaging means pressed out of the plane of the arm on which it is provided to present an integral locking thread to said bolt or screw element capable of locking the same in applied position.

5. A device for use with an adjustable threaded member as an adjustable check or gauge device, said device including a nut section for threadedly engaging said threaded member and a tail section receivable in a guide slot in a part for preventing rotation of said nut section relative to said part, said device comprising a sheet metal body having a bend providing a pair of spaced arms extending in the same general direction to form said nut section, said arms having aligned openings and being provided with outwardly bent portions defining a passage for said threaded member, complementary thread surfaces on the inner faces of said outwardly bent portions for threadedly engaging said threaded member, a bolt or screw element passing through said aligned openings for drawing said spaced arms toward each other to effect a tightened threaded engagement of said complementary thread surfaces with said threaded member, an extension on one of said arms of the nut section defining said tail section, and a finger element in spaced relation to said tail section and adapted to co-operate therewith in being snugly received in the guide slot in said part for slidable movement relative to said part.

6. A device for use with an adjustable threaded member as an adjustable check or gauge device, said device including a nut section for threadedly engaging said threaded member and a tail section receivable in a guide slot in a part for preventing rotation of said nut section relative to said part, said device comprising a sheet metal body having a substantially U-shaped bend providing a pair of spaced arms extending in the same general direction to form said nut section, outwardly bent portions on said arms defining a passage for said threaded member, complementary thread surfaces on the inner faces of said outwardly bent portions for threadedly engaging said threaded member, said arms having aligned openings between said outwardly bent portions and the bight of said U-shaped bend, a bolt or screw element passing through said aligned openings for drawing said spaced arms toward each other to effect a tightened threaded engagement of said complementary thread surfaces with said threaded member, an extension on one of said arms of the nut section defining said tail section, and a finger element in spaced relation to said tail section and adapted to cooperate therewith in being snugly received in the guide slot in said part for slidable movement relative to said part.

7. A fastening device for use with an adjustable threaded member for adjustably securing cooperating relatively movable parts in an assembly, said device including a nut section for threadedly engaging said threaded member connected to one of said parts and a tail section for attaching the device to a cooperating part, said device comprising a sheet metal body having a bend providing a pair of spaced arms extending in the same general direction to form said nut section, said arms having aligned openings and being provided with outwardly bent portions defining a passage for said threaded member, complementary thread surfaces on the inner faces of said outwardly bent portions for threadedly engaging said threaded member, a bolt or screw element passing through said aligned openings for drawing said spaced arms toward each other to effect a tightened threaded engagement of said complementary thread surfaces with said threaded member, and an extension on one of said arms of the nut section defining said attaching tail section at substantially right angles thereto of the fastening device.

8. A fastening device for use with an adjustable threaded member for adjustably securing cooperating relatively movable parts in an assembly, said device including a nut section for threadedly engaging said threaded member connected to one of said parts and a tail section for attaching the device to a cooperating part, said device comprising a sheet metal body having a bend providing a pair of spaced arms extending in the same general direction to form said nut section, said arms having aligned openings and being provided with outwardly bent portions defining a passage for said threaded member, complementary thread surfaces on the inner faces of said outwardly bent portions for threadedly engaging said threaded member, a bolt or screw element passing through said aligned openings for drawing said spaced arms toward each other to effect a tightened threaded engagement of said complementary thread surfaces with said threaded member, an extension on one of said arms of the nut section defining said tail section, a bent portion on said tail section defining an attaching flange, an integral thread engaging means provided on said flange to threadedly engage an attaching screw for securing the fastening device to its associated part.

9. A nut device comprising a sheet metal body having a bend providing a pair of cooperating resilient arms extending in the same general direction, each of said arms being bent outwardly to provide an inner face portion on each arm in spaced relation to the inner face portion of the other arm in defining a passage for a threaded member, complementary thread surfaces on said inner face portions of the cooperating arms for threadedly engaging said threaded member, means acting on the arms between the bend and the thread-carrying portion for tensioning said arms in engagement with said threaded member, a positioning tail member extending from one of the arms, and a guide slidably engaged by the positioning member to prevent the nut device rotating about the axis of the threaded member.

GEORGE A. TINNERMAN.